US011879551B2

(12) United States Patent
Gregg et al.

(10) Patent No.: US 11,879,551 B2
(45) Date of Patent: Jan. 23, 2024

(54) PRESSURE CONTROL VALVE

(71) Applicant: Bendix Commercial Vehicle Systems LLC, Avon, OH (US)

(72) Inventors: Kenneth Gregg, Strongsville, OH (US); Chinmay Upponi, North Ridgeville, OH (US); Jan Grebe, Starnberg (DE); Christoph Hoffman, Gäufelden (DE); Manuel Eduardo Beltran Mendoza, Apodaca (MX)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 311 days.

(21) Appl. No.: 17/532,158

(22) Filed: Nov. 22, 2021

(65) Prior Publication Data

US 2023/0160484 A1    May 25, 2023

(51) Int. Cl.
*F16K 15/03* (2006.01)
*F16K 27/02* (2006.01)

(52) U.S. Cl.
CPC .......... *F16K 15/03* (2013.01); *F16K 27/0227* (2013.01)

(58) Field of Classification Search
CPC ....... B60T 15/18; F16K 15/03; F16K 27/0227
See application file for complete search history.

(56) References Cited

U.S. PATENT DOCUMENTS

| 134,220 | A | * | 12/1872 | Riley | ............ | F16K 15/03 |
| | | | | | | 137/512.3 |
| 752,976 | A | * | 2/1904 | Houplain | ............ | B60T 15/18 |
| | | | | | | 303/74 |
| 5,100,208 | A | | 3/1992 | Bosch | | |
| 6,209,971 | B1 | | 4/2001 | Ho | | |
| 7,255,122 | B2 | | 8/2007 | Ho | | |
| 9,200,753 | B2 | | 12/2015 | Peabody | | |
| 10,981,551 | B2 | | 4/2021 | Wabco | | |
| 2014/0034131 | A1 | | 2/2014 | Peabody | | |
| 2018/0326964 | A1 | * | 11/2018 | Koelzer | ............ | B60T 11/326 |
| 2021/0129820 | A1 | | 5/2021 | Bialon | | |

FOREIGN PATENT DOCUMENTS

| DE | 102015016264 A1 | 6/2017 |
| WO | 9109760 A1 | 7/1991 |
| WO | 2023041155 A1 | 3/2023 |

OTHER PUBLICATIONS

European Patent Office, International Search Report and Written Opinion, Report, Jul. 24, 2023, 9 pages, European Patent Office, Munich Germany.

* cited by examiner

*Primary Examiner* — P. Macade Nichols
(74) *Attorney, Agent, or Firm* — Cheryl L. Greenly; Brian E. Kondas

(57) ABSTRACT

A pressure control valve includes an upper body, a lower body affixed to the upper body, a supply passage in the upper body, a delivery passage in the upper body, an exhaust passage in the lower body and a pivotable member positioned between the supply passage and the delivery passage. The pivotable member has a generally curved body, a first leg, a second leg and a third leg extending from the body. The pivotable member pivots on the second leg and the third leg in response to air pressure in the supply passage being less than the air pressure in the delivery passage. The positioning of the pivotable member restricts air from flowing from the delivery passage to the supply passage, thereby opening a path for the air to pass to the exhaust passage.

9 Claims, 4 Drawing Sheets

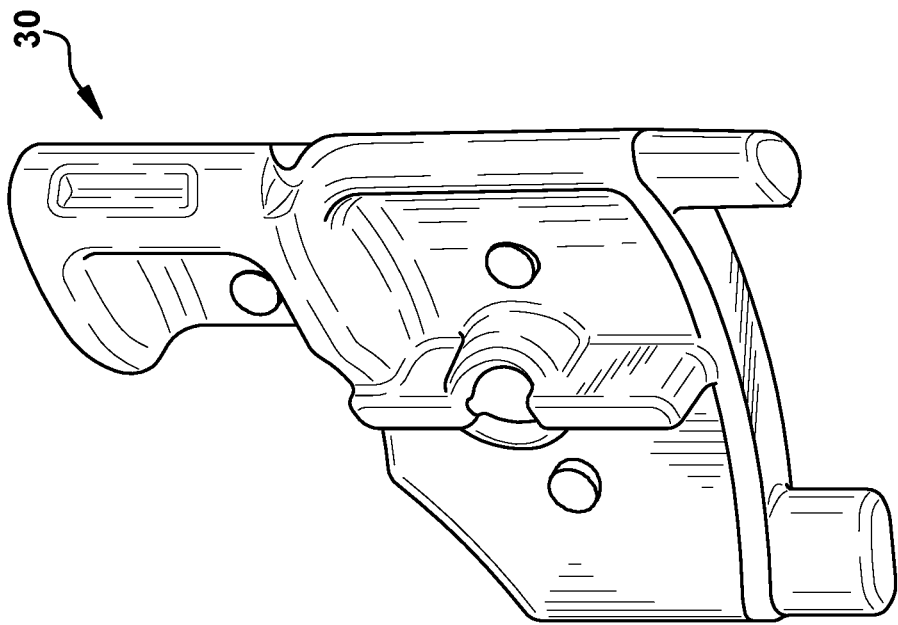
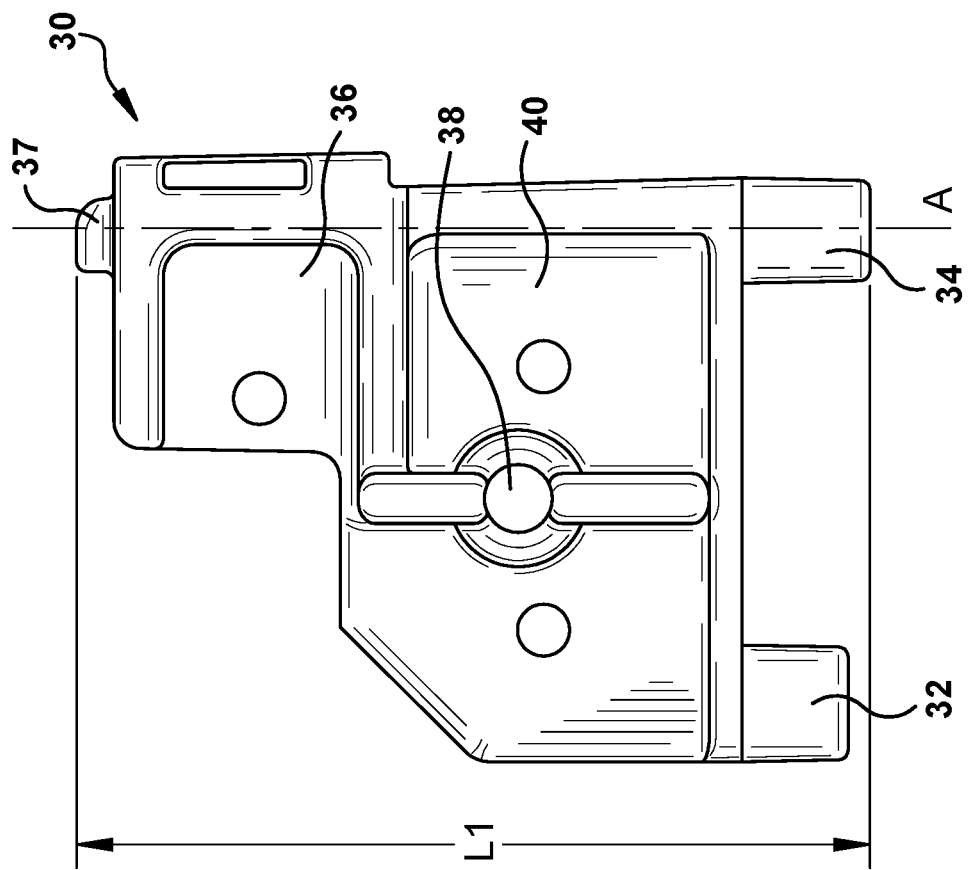
Fig. 2B
Fig. 2A

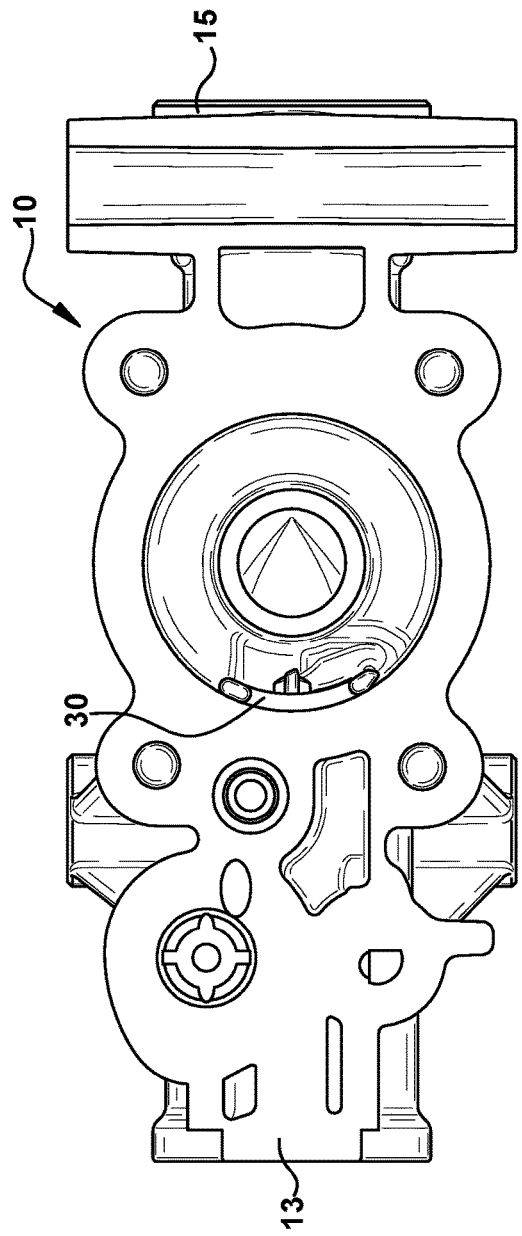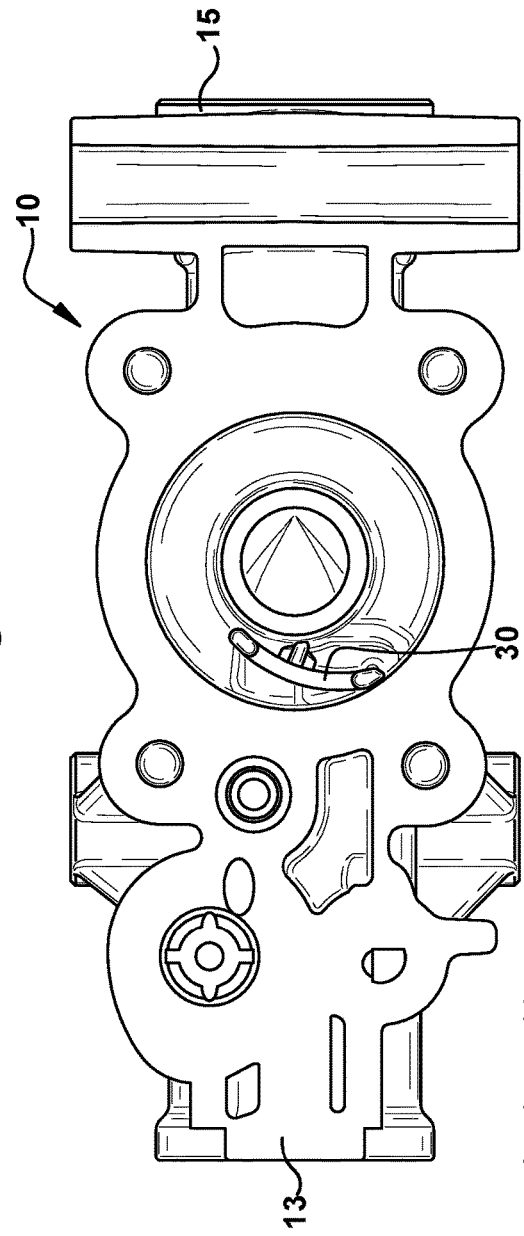

PRESSURE CONTROL VALVE

BACKGROUND

The present application relates to a pressure control valve used in pneumatic braking systems for commercial vehicles.

A pressure control valve, also known as a modulator, is used to regulate the air pressure in brake cylinders during an anti-lock braking or similar event. The air pressure to a friction braking device at a wheel end is precisely controlled through solenoids that direct control pressure through passages built into the pressure control valve. The timing required to exhaust the control pressure in the pressure control valve after a vehicle braking event is regulated by law. Traditional pressure control valves have used bias pistons and large cross sectional diameter ports to direct the control pressure to exhaust at the end of the anti-lock braking event. These solutions require multiple components and complicated assemblies. Accordingly, those skilled in the art continue with research and development efforts in the field of pressure control valves to improve the exhaust timing.

SUMMARY

In accordance with one embodiment, a pressure control valve includes an upper body, a lower body affixed to the upper body, a supply passage in the upper body, a delivery passage in the upper body, an exhaust passage in the lower body and a pivotable member positioned between the supply passage and the delivery passage. The pivotable member has a generally curved body, a first leg, a second leg and a third leg extending from the body. The pivotable member pivots on the second leg and the third leg in response to air pressure in the supply passage being less than the air pressure in the delivery passage. The positioning of the pivotable member restricts air from flowing from the delivery passage to the supply passage, thereby opening a path for the air to pass to the exhaust passage.

In accordance with another embodiment, a method of controlling air flow in a brake valve includes passing air through a delivery passage of the brake valve and into contact with a pivotable member disposed on a diaphragm between the delivery passage and the supply passage. A pivotable member pivots in response to a higher air pressure in the delivery passage than the supply passage. Air is then passed through an exhaust passage of the brake valve in response to the pressure differential between the delivery passage and the supply passage.

BRIEF DESCRIPTION OF THE DRAWINGS

FIG. 2A is a representation of the pivotable member prior to installation in the valve of FIG. 1A.

FIG. 2B is an isometric view of the pivotable member of FIG. 2A.

FIG. 3A is a representational cross sectional view of the valve of FIG. 1A as rotated ninety degrees on the x-axis, where the pivotable member is in an exhaust position.

FIG. 3B is a view of the valve as shown in FIG. 3A, where the pivotable member is in an apply position.

DETAILED DESCRIPTION

Figure 1A:
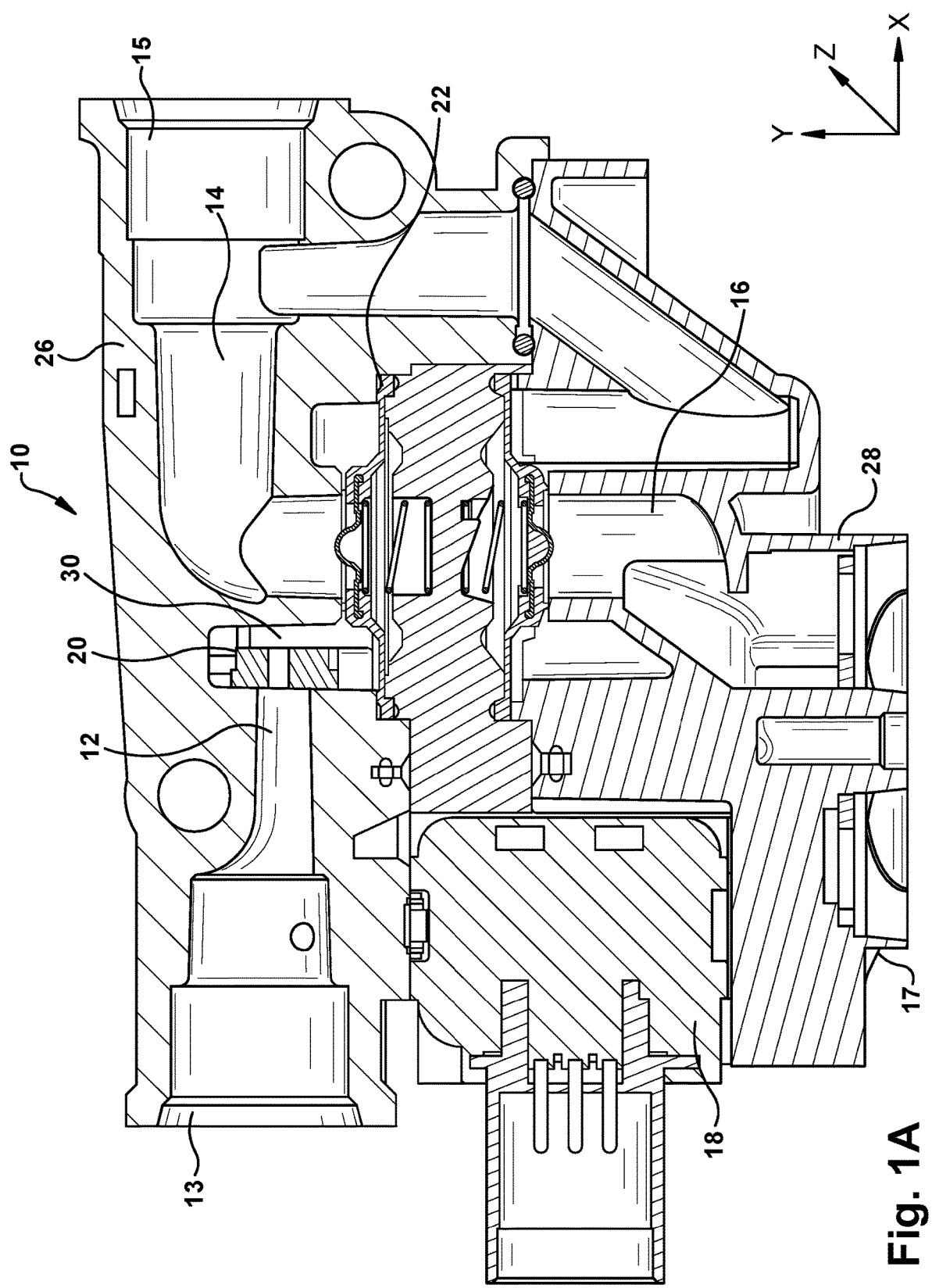
FIG. 1A is a representational cross sectional view of a pressure control valve having a pivotable member according to one example of the present invention.

Referring to FIG. 1A, a cross sectional view of a pressure control valve 10 is illustrated. The valve 10 comprises an upper body 26 and a lower body 28. The upper body 26 and lower body 28 are machined, molded, or cast. The upper body 26 and lower body 28 are held together by fasteners (such as screws), welding, or other means of attachment. The material of the valve 10 can be a metal or a polymer or both. Polymer materials include, but are not limited to, thermoset polymers and thermoplastic polymers. Metals include, but are not limited to, aluminum, steel, and zinc. In one embodiment, the upper body 26 and the lower body 28 are made of aluminum.

A supply port 13 and a supply passage 12 for receiving pressurized air are formed in the upper body 26. A delivery port 15 and a delivery passage 14 for delivering pressurized air to an associated braking device are formed in the upper body 26. An exhaust port 17 and an exhaust passage 16 for exhausting pressurized air to atmosphere is formed in the lower body 28. Each of the passages 12, 14, 16 are in communication with each other at different operating states of the pressure control valve 10.

A diaphragm 22 separates the supply passage 12 from the delivery passage 14 when no pressure is being applied to the supply port 13. When air pressure is present in the supply passage 12, the diaphragm 22 moves to allow communication between the delivery passage 14 and the supply passage 12.

A solenoid assembly 18 is assembled into the lower body 28 for controlling the movement of the pressurized air among the supply passage 12, the delivery passage 14 and the exhaust passage 16. The solenoid assembly 18 receives an electrical control signal from a control unit (not shown).

A pivotable member 30 is disposed longitudinally in the supply passage 12, when the valve 10 is in the position shown in FIG. 1A. One end of the pivotable member 30 rests on the diaphragm 22 that separates the supply passage 12 from the delivery passage 14. The opposite end of the pivotable member 30 is secured in a cavity 20 formed in the upper body 26.

FIG. 2A shows the pivotable member 30 by itself. The pivotable member 30 has a generally curved body 40 having a first leg 32 and a second leg 34. A third leg 36 is located on an opposite side of the body 40 as the first leg 32 and second leg 34. The first leg 32 has a length of about 2.7 mm, which is shorter than the length of about 3 mm of the second leg 34. The overall length L1 of the pivotable member 30 is about 24 mm.

The third leg 36 is wider than the first leg 32 and second leg 34. As shown in FIG. 2A, the third leg 36 has a width of about half of the overall width of the body 40. The third leg 36 includes a protrusion 37 that assists in the pivoting motion of the pivotable member 30 when inserted in the cavity 20. The pivotable member 30 pivots on an axis A through the second leg 34 and third leg 36. The wider shape of the third leg 36 is beneficial because it guides the pivoting motion.

An aperture 38 may be located in an approximate central portion of the body 40. The diameter of the aperture 38 may be changed based on desired timing when the valve 10 is being exhausted.

The material of the pivotable member 30 includes, but is not limited to, metal, rubber or plastic or a combination of materials.

Figure 1C:
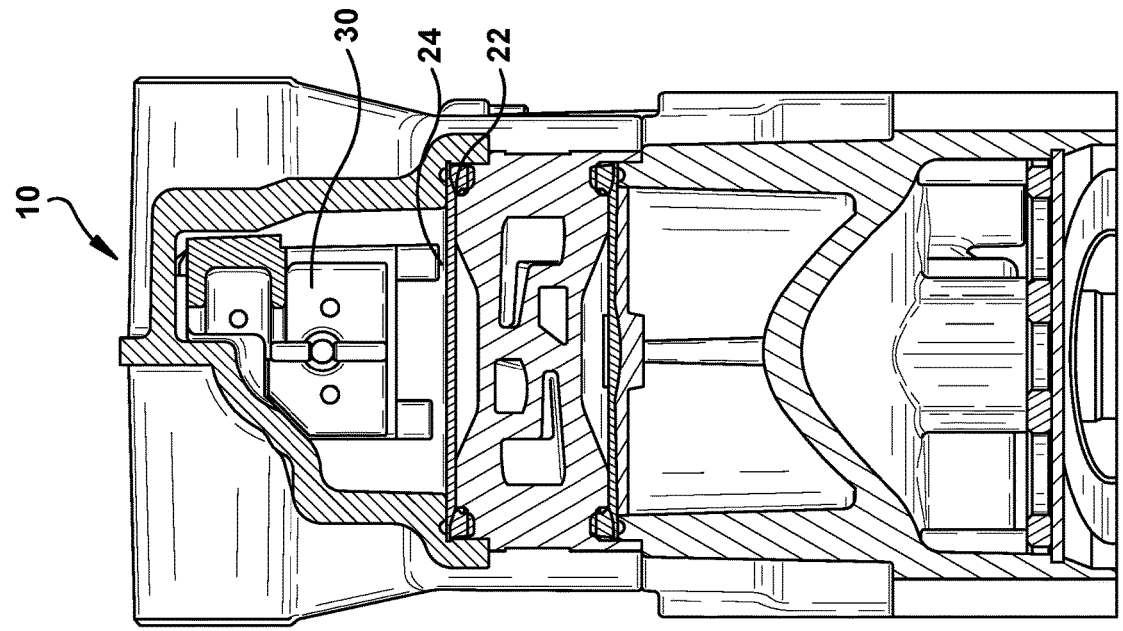
FIG. 1C is a representational cross sectional view of the valve of FIG. 1B having a support plate.
Figure 1B:
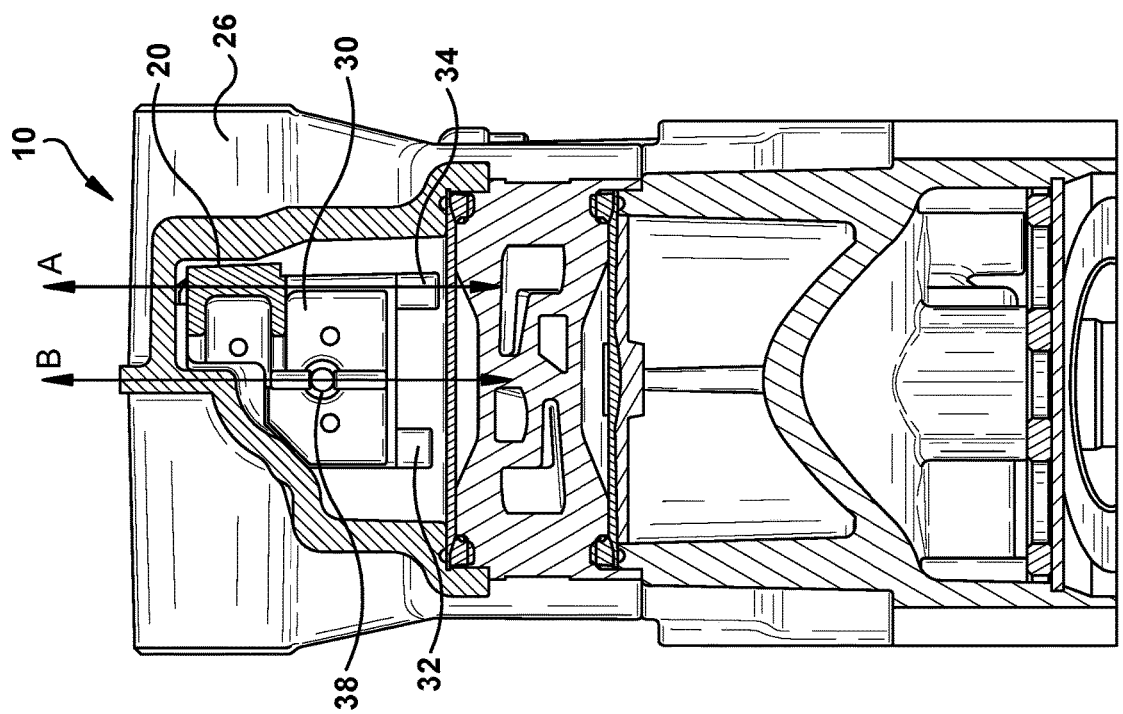
FIG. 1B is a representational cross sectional view of the valve of FIG. 1A as rotated ninety degrees on the y-axis.

FIG. 1B shows a cross section view of the valve 10, as rotated ninety degrees on the y-axis from the view in FIG. 1A. The pivotable member 30 as shown in FIG. 2A is installed in the supply passage 12 in the upper body 26. The pivotable member 30 overlays the entire diameter of the supply passage 12. The aperture 38 is in line with the supply passage 12.

The second leg 34 of the pivotable member 30 rests on the diaphragm 22. The second leg 34 rests on a location offset by two millimeters or more from a top surface of the diaphragm 22. This positioning allows for the diaphragm 22 to move axially during operation of the valve 10. The first leg 32 does not touch the diaphragm 22.

The cavity 20 in the upper body 26 receives the third leg 36. The cavity 20 is shaped to hold the third leg 36 while still allowing the pivotable member 30 to pivot on the axis A. The axis A is generally parallel to an axis B that runs centrally through the diaphragm 22. However, the pivotable member 30 may tilt from axis A because it is not secured in place at the second leg 34.

The first leg 32 guides the pivotable member 30 and limits any tilt or inclination during movement to less than about 20° from a plane made by the first leg 32, the second leg 34 and the third leg 36 in response to the air pressure. Tilt or inclination of up to about 20° does not affect the ability of the pivotable member 30 to seal the supply passage 12.

In another embodiment, as shown in FIG. 1C, a support plate 24 also separates the supply passage 12 from the delivery passage 14. The support plate 24 rests on the diaphragm 22. The second leg 34 of the pivotable member 30 rests on the support plate 24, which in turn rests on the diaphragm 22. The benefit of the support plate 24 is to protect the diaphragm 22 from over-extension throughout the operation of the valve 10.

FIG. 2B shows an isometric view of the pivotable member 30 of FIG. 2A. The curve of the body 40 is formed to complement the cylindrical shape of the interior wall at the supply passage 12 of the valve 10 to improve the sealing of the supply passage 12 when in the exhaust position.

Therefore, a pressure control valve includes an upper body, a lower body affixed to the upper body, a supply passage in the upper body, a delivery passage in the upper body, an exhaust passage in the lower body and a pivotable member positioned between the supply passage and the delivery passage. The pivotable member has a generally curved body, a first leg, a second leg and a third leg extending from the body. The pivotable member pivots on the second leg and the third leg in response to air pressure in the supply passage being less than the air pressure in the delivery passage. The positioning of the pivotable member restricts air from flowing from the delivery passage to the supply passage, thereby opening a path for the air to pass to the exhaust passage.

FIG. 3A shows a cross sectional view of the valve 10 as in FIG. 1A but rotated ninety degrees on the x-axis. The locations of the supply port 13 and delivery port 15 are shown for orientation purposes. The pivotable member 30 is in an exhaust position, where air is being diverted from the delivery passage 14 to the exhaust passage 16 because the pressure in the delivery passage 14 is greater than the pressure in the supply passage 12. This state occurs at the end of a braking event. While a majority of air exits through the exhaust passage 16 through the exhaust port 17 to atmosphere, a portion flows back to the supply passage 12.

The pivotable member 30 closes the supply passage 12, except for a portion of the air that passes through the aperture 38. Having a portion of air pass through the aperture 38 between the supply passage 12 and the delivery passage 14 is beneficial to exhaust air more quickly from the associated braking device.

The aperture 38 is sized to assist in driver feel as the service brakes are released. If a perfect seal existed between the delivery passage 14 and the supply passage 12, the release of the service brakes would feel more sudden rather than the gradual release as expected by a driver. In addition, if the exhaust passage 16 is blocked, such as by debris or frozen water, the aperture 38 provides another means for pressurized air to exit the valve 10.

In the exhaust position, the time to exhaust air from the delivery passage 14 to the exhaust passage 16 at the end of a braking event is reduced by between about 2% to about 20% from a valve that does not have the inventive pivotable member 30.

FIG. 3B shows a view of the valve 10 as in FIG. 3A, but now the pivotable member 30 is shown in an apply position. The pivotable member 30 is moved about two to three millimeters laterally from the exhaust position. The air from the supply passage 12 is greater than in the delivery passage 14, causing the pivotable member 30 to pivot to open a pathway for the pressurized air between the supply passage 12 and the delivery passage 14. The travel of the pivotable member 30 from the apply position to the exhaust position in one example is from about ten degrees to about twenty five degrees.

The first leg 32 is shaped so as to prevent the pivotable member 30 from tilting when moving from the exhaust position to the apply position. No biasing spring or other element is necessary for the pivotable member 30 to move from the apply position to the exhaust position. No machined or welded stop feature inside the valve 10 is required to prevent excess movement of the pivotable member 30. Therefore, both the location proximate to the supply passage 12 and the novel shape of the pivotable member 30 improves the ability to move from the apply position to the exhaust position and the speed at which air is exhausted the air from the delivery passage 14.

Therefore, a method of controlling air flow in a brake valve includes passing air through a delivery passage of the brake valve and into contact with a pivotable member disposed on a diaphragm between the delivery passage and the supply passage. A pivotable member pivots in response to a higher air pressure in the delivery passage than the supply passage. Air is then passed through an exhaust passage of the brake valve in response to the pressure differential between the delivery passage and the supply passage.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A pressure control valve comprising
    an upper body;

a lower body affixed to the upper body;

a supply passage in the upper body;

a delivery passage in the upper body;

an exhaust passage in the lower body; and a pivotable member positioned between the supply passage and the delivery passage, the pivotable member having a generally curved body, a first leg, a second leg and a third leg extending from the body, wherein the pivotable member pivots on the second leg and the third leg in response to air pressure in the supply passage being less than the air pressure in the delivery passage and restricts air from flowing from the delivery passage to the supply passage, thereby opening a path for the air to pass to the exhaust passage.

2. The pressure control valve as in claim 1, the rotatable member further includes an aperture in the body.

3. The pressure control valve as in claim 1, further comprising a diaphragm between the supply passage and the delivery passage, wherein the second leg is positioned on an outer portion of a first surface of the diaphragm.

4. The pressure control valve as in claim 3, wherein a pivoting axis of the pivotable member is parallel to an axis of the diaphragm.

5. The pressure control valve as in claim 1, further comprising a support plate and a diaphragm, wherein the support plate rests on the diaphragm and the second leg is positioned on an outer portion of a first surface of the support plate.

6. The pressure control valve as in claim 1, further comprising an opening in the upper body for receiving the third leg.

7. The pressure control valve as in claim 1, wherein the first leg is shorter than the second leg and prevents the rotatable member from inclining more than 20° in a direction in a plane made by the first leg, the second leg and the third leg in response to the air pressure.

8. The pressure control valve as in claim 1, wherein the rotatable member is constructed of at least one of a plastic, metallic or rubber material.

9. A method of controlling air flow in a brake valve comprising:

passing air through a delivery passage of the brake valve and into contact with a pivotable member disposed on a diaphragm between the delivery passage and the supply passage;

pivoting the pivotable member in response to a higher air pressure in the delivery passage than the supply passage; and passing the air through an exhaust passage of the brake valve in response to the pressure differential between the delivery passage and the supply passage.

\* \* \* \* \*